April 2, 1968 W. N. PRATT 3,375,694
MAGNETIC HIGH ENERGY RATE FORMING APPARATUS
Filed March 9, 1966
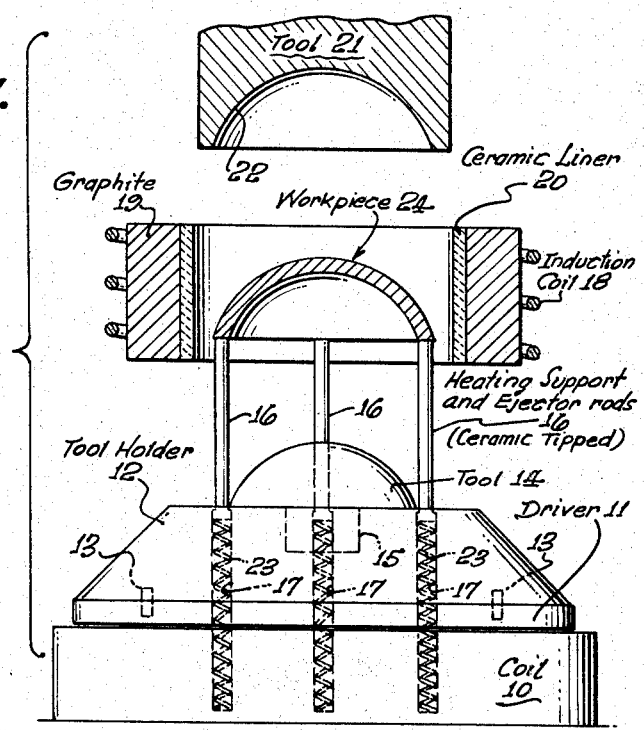
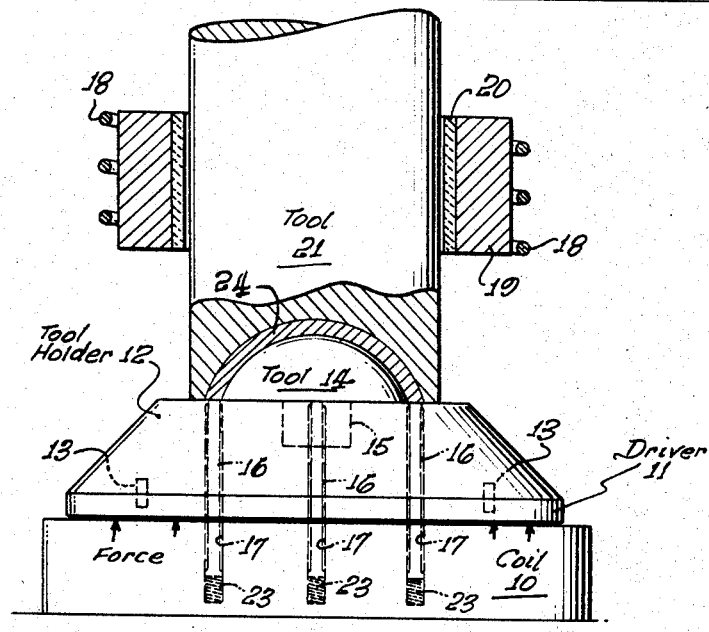
INVENTOR.
WILSON N. PRATT,
By
ATTORNEY.
AGENT.

United States Patent Office 3,375,694
Patented Apr. 2, 1968

---

3,375,694
MAGNETIC HIGH ENERGY RATE
FORMING APPARATUS
Wilson N. Pratt, Anaheim, Calif., assignor to General
Dynamics Corporation, a corporation of Delaware
Filed Mar. 9, 1966, Ser. No. 533,082
10 Claims. (Cl. 72—361)

This invention relates to forming apparatus, particularly to forming apparatus utilizing the application of a high intensity magnetic field, and more particularly to a high energy rate magnetic forming apparatus for consolidating preforms of pulverant materials to produce a born to shape article.

While various prior art methods, and apparatus for carrying out these methods, have been developed to form articles from pulverant material, the expense of producing such articles by these prior arrangements has limited the areas in which such could be utilized. For example, forming magnesium fluoride used for the manufacture of optical components has been in the past accomplished by a vacuum hot press arrangement which is a time consuming operation and thus expensive. In addition, these billets, thus formed, then require machining and polishing to produce the desired optical component, again increasing the cost of the component.

This invention overcomes these prior art disadvantages by providing an apparatus which will more rapidly form pulverant materials, such as magnesium fluoride, into a born to shape article, thus greatly reducing the forming time and substantially eliminating the machining and polishing operations required by the prior art methods.

Therefore, it is an object of this invention to provide a magnetic high energy forming apparatus.

A further object of the invention is to provide an apparatus capable of magnetically forming articles substantially to shape from pulverant material.

Another object of the invention is to provide a high energy rate magnetic forming apparatus capable of consolidating ceramic or metal powder porous preforms which require heating prior to forming and controlled cooling after forming, while maintaining the tooling at a relatively cool temperature, and without damage to the formed part.

Another object of the invention is to provide an apparatus for producing articles from preforms made of pulverant material, such as magnesium fluoride, which require the preform to be hit while hot and removed from the tooling to prevent damage to the formed article and overheating of the tooling.

Other objects of the invention, not specifically set forth above, will become readily apparent from the following description and accompanying drawings wherein:

FIG. 1 is a front view partially in cross-section illustrating an embodiment of the invention in the heating or cooling portion of the cycle; and FIG. 2 is a view showing the FIG. 1 apparatus in the forming portion of the cycle.

Broadly, this invention is directed to an apparatus which includes means for supporting a workpiece outside a pair of forming dies during the heating of the workpiece and cooling of the formed article, and means for very rapidly forming the workpiece by the dies, the last mentioned means including a high energy rate magnetically actuated assembly.

Forming preheated material by the application of a high intensity magnetic field is known in the art as exemplified by U.S. Patent No. 2,976,907. In such devices a magnetic field of high flux density is set up about a shaped conductor due to the discharge of an associated capacitor by passing the current pulse of high amperage from capacitor through the conductor. The high density field induces a current in a metal workpiece disposed in the magnetic field. The interaction between the high density magnetic field and the magnetic field produced by the induced current in the workpiece produces an impulse on the workpiece which, when made great enough, forms the metal workpiece.

As will be seen hereinafter, the magnetic field of the conductor in the instant apparatus interacts with the magnetic field of the tool or die holder which functions as a driver for forming the preheated workpiece positioned on the tool by an associated tooling member. Thus, in this invention the magnetic field interaction is not between the conductor and the workpiece as in the prior known magnetic forming devices but between the conductor and the tool holder or driver.

Referring now to the drawings, the high energy rate magnetic forming apparatus of this invention generally comprises a coil 10 which is operably mounted on a support member (not shown) in conventional manner, a driver 11 positioned on coil 10, a tool holder 12 mounted on driver 11 via dowels 13 or the like, a tool 14 removably mounted on tool holder 12 via a tool retaining mechanism indicated at 15, and a plurality of workpiece support and ejector rods 16 which are adapted to retract into cavities 17 shown in dashed lines in tool holder 12, driver 11 and coil 10 for purposes described hereinafter. Supported by means not shown and in spaced relationship with respect to tool holder 12 is an induction coil 18 which surrounds a hollow heater member 19, which may be constructed of graphite, for example, member 19 being provided with an internal liner 20 which may be of a ceramic or other suitable material. An upper tool 21 is positioned above and adapted to extend through the hollow member 19 as will be described hereinafter. Tool 21 is suspended and reciprocally driven by suitable mechanism (not shown), such driving mechanism being well known in the art. The lower end of tool 21, as shown, is provided with a concave portion 22 constructed to conform with the configuration of the tool 14 which, in this embodiment, is configured to define a portion of a sphere.

The driver 11 is constructed from a high conductive material such as copper or aluminum, for example. Workpiece support rods 16 may be ceramic tipped and are normally positioned as shown in FIG. 1 by resilient means such as springs 23 or other suitable means which allow rods 16 to retract into cavities 17 during the forming portion of the operation as shown in FIG. 2. The coil 10 and induction coil 18 are each operatively connected with a power source and control mechanism therefor (not shown), which are within the skill of the art and thus will not be described in detail herein. If desired, the external surface of tool 14 and the surface of concavity 22 may be provided with heat resistant material.

In operation, a preformed workpiece 24 of pulverant material such as magnesium fluoride, for example, is positioned on the support rods 16 within the heating unit or member 19, and the induction coil or induction heater (see FIG. 1), which may be controlled by a thermocouple or other means, is actuated. If specific heating rates are required for the material being formed, a program controller of the type known in that art may be operatively connected with the induction coil 19. The workpiece 24 is brought up to the required temperature, for example, 2000° F., and soaked to uniformity, after which the power to the coil 19 is shut off. The top punch, or tool 21 quickly positions the preform 24 on tool 14 by compressing springs 23 by the lowering of rods 16 and holds the preform for forming as shown in FIG. 2. The coil 10 discharges through its capacitor arrangement in the manner known in that art, and a high energy rate blow is delivered to the tool 14 through the driver 11, as indicated by the force arrows in FIG. 2, forming the heated preformed workpiece 24 to the desired shape and size. The holding pressure on top tool 21 is then released and the tool raised to the FIG. 1 position while the resiliently supported rods 16 return the formed article to the heating section (member 19 and coil 18). The coil is then actuated to provide the proper cooling rate for the formed article, if such is required, after which it is removed for finishing.

The above described apparatus may be utilized under either vacuum or controlled atmosphere conditions by suitably enclosing the apparatus and evacuating and controlling the environment therein by means conventional in the art.

As seen from the above description, the temperature of the preform can be substantially maintained at the desired temperature during the forming operation due to the very short time that the preform is in contact with the forming tools which additionally prevents the tooling from being appreciably heated thus increasing the life thereof. However, if needed, the tooling could be readily heated and maintained at a desired temperature.

The energy delivered by the apparatus can be controlled by the distance that the driver moves or by the amount of stored energy in the coil control capacitor. This control will eliminate bounce of the forming tools and thus prevent damage of the formed article due to the inherent bounce of other types of high energy rate forming machines.

Although this description has been primarily directed to the forming of workpieces constructed of magnesium fluoride, the apparatus may be effectively utilized for forming parts from many different types of powder preforms including anhydrous salts (ceramics) or metal. Also, the apparatus of this invention may be used for forming metal sheet which must be worked in an atmosphere because of its chemical activity, such metals, for example, being titanium alloys, zirconium alloys, and austenitic stainless steel. Also, if desired, the driver, tool holder and tool may be combined or any other combination thereof combined.

Depending on the internal energy of the compound being formed, varying forming pressures will be utilized. It has been shown that 45,000 p.s.i. is necessary for forming potassium iodide and up to 12,000 p.s.i. for lithium fluoride, this energy being applied at a temperature at which the material will be amendable to impulsive deformation.

In tests conducted on magnesium fluoride, this material was hit at approximately 2000° F. with the forming apparatus calculated to be operating at 130,000 p.s.i., and the material consolidated under a vacuum forming condition.

Considerably lower pressures can be used with metals because of their very low internal energy in the forming condition for the consolidation of metal powder at high temperatures (conventional forging temperatures). The impulsive load on the metal powder preform can be as low as 10,000 p.s.i. on steel.

It has thus been shown, that this invention provides a forming apparatus which will produce born to shape articles from pulverant materials without adverse effects on the tooling or the formed article, thus greatly advancing the state of the forming art.

While a particular embodiment of the invention has been illustrated and described, modifications will become apparent to those skilled in the art, and it is intended to cover in the appended claims all such modifications as come within the true spirit and scope of the invention.

What I claim is:

1. A forming apparatus comprising: means for heating and controlling the temperature of a workpiece to be formed; means for moving an associated workpiece from said controlling means and positioning such an associated heated workpiece on a tool; means for driving said tool against an associated heated workpiece; and means for repositioning an associated formed workpiece in said temperature controlling means for cooling such a formed workpiece; said driving means including a high energy rate magnetically actuated means.

2. The forming apparatus defined in claim 1, wherein said temperature controlling means includes a hollow member and an induction coil positioned around said member.

3. The forming apparatus defined in claim 2, wherein said hollow member is constructed of graphite and provided with a liner means on the internal surface thereof.

4. The forming apparatus defined in claim 1, wherein said means for positioning an associated heated workpiece includes a tooling member having an end thereof configured to cooperate with the configuration of said tool, whereby an associated heated workpiece may be formed therebetween to define the configuration of said end of said tooling member and said tool.

5. The forming apparatus defined in claim 4, wherein at least said end of said tooling member and said tool are provided with a heat resistance material on the surface thereof.

6. The forming apparatus defined in claim 1, wherein said means for repositioning an associated formed workpiece includes a plurality of resiliently supported rod means.

7. The forming apparatus defined in claim 6, wherein said rod means are provided with a ceramic layer at the ends thereof adapted to contact an associated workpiece.

8. The forming apparatus defined in claim 1, wherein said driving means additionally includes a driver member constructed of a highly conductive material whereby a high density magnetic field generated by said magnetically actuated means induces a current in said driver member causing a magnetic field therebetween and the interaction of the magnetic fields causes said driver member to deliver a high energy rate blow to said tool for forming an associated workpiece positioned against said tool.

9. The forming apparatus defined in claim 1, wherein said means for driving said tool against an associated heated workpiece additionally includes a driver member constructed of a highly conductive material and a tool holder member, said tool holder member including means for removably supporting said tool therein.

10. The forming apparatus defined in claim 1 in combination with a preformed workpiece formed from pulverant materials to be formed by said apparatus wherein said workpiece is supported by said repositioning means and initially heated to a desired temperature by said temperature controlling means, wherein said heated workpiece is moved by said positioning means from said temperature controlling means and positioned and held against said tool by said positioning means, formed at a high energy rate by said magnetically actuating driving means, and after forming said workpiece is repositioned within said temperature controlling means by said repositioning means for proper cooling of said formed workpiece.

References Cited

UNITED STATES PATENTS

| | | | |
|---|---|---|---|
| 1,380,250 | 5/1921 | Reymond | 72—342 |
| 2,328,742 | 9/1943 | Rogers et al. | 72—364 |
| 2,358,667 | 9/1944 | Stern | 29—420.5 |
| 3,264,716 | 8/1966 | Silver | 29—420.5 |

RICHARD J. HERBST, *Primary Examiner.*